(12) United States Patent
Baeuerle et al.

(10) Patent No.: US 8,495,991 B2
(45) Date of Patent: Jul. 30, 2013

(54) METHOD FOR OPERATING AN INTERNAL COMBUSTION ENGINE

(75) Inventors: Michael Baeuerle, Eberdingen (DE); Martin Klenk, Backnang (DE); Udo Sieber, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 531 days.

(21) Appl. No.: 12/818,816

(22) Filed: Jun. 18, 2010

(65) Prior Publication Data

US 2011/0004393 A1  Jan. 6, 2011

(30) Foreign Application Priority Data

Jul. 1, 2009  (DE) .......................... 10 2009 027 385

(51) Int. Cl.
*F02B 33/00* (2006.01)

(52) U.S. Cl.
USPC .................................. 123/559.1; 123/184.33

(58) Field of Classification Search
USPC ........... 123/559.1–559.3, 565, 520; 251/68.7, 251/309.71, 297, 129.11; 60/608
See application file for complete search history.

(56) References Cited

U.S. PATENT DOCUMENTS

| | | | | |
|---|---|---|---|---|
| 5,048,470 A | * | 9/1991 | Geddes et al. | ........... 123/184.42 |
| 5,706,790 A | * | 1/1998 | Kemmler et al. | ............. 123/564 |
| 6,055,966 A | * | 5/2000 | Zentgraf | ........................ 123/563 |
| 6,138,648 A | * | 10/2000 | Zentgraf | ........................ 123/563 |
| 2005/0000215 A1 | * | 1/2005 | Baeuerle | ......................... 60/608 |
| 2008/0289610 A1 | * | 11/2008 | Nguyen-Schaefer et al. | ......................... 123/559.1 |

* cited by examiner

*Primary Examiner* — John Kwon
(74) *Attorney, Agent, or Firm* — Kenyon & Kenyon LLP

(57) ABSTRACT

A method for operating an internal combustion engine in which combustion air is supplied to a combustion chamber of the internal combustion engine, which air is compressed with the aid of a pulse supercharger, the pulse supercharger being controlled in such a way that optionally, in a first operating mode, the combustion air is compressed in order to support a compressor of a turbocharger, or in a second operating mode, the combustion air compressed with the aid of the compressor is cooled.

10 Claims, 3 Drawing Sheets

METHOD FOR OPERATING AN INTERNAL COMBUSTION ENGINE

FIELD OF THE INVENTION

The present invention relates to a method for operating an internal combustion engine in which combustion air compressed with the aid of a pulse supercharger is supplied to a combustion engine of the internal combustion engine.

Furthermore, the present invention relates to a computer program and a control unit for an internal combustion engine.

BACKGROUND INFORMATION

A pulse supercharger is used for closing the intake duct of an internal combustion engine during an intake contact, so that vacuum pressure is produced in the combustion chamber when a piston of the internal combustion engine is moving in the direction of bottom dead center. If the pulse supercharger is then opened suddenly, the aspirated air column is accelerated due to the vacuum pressure in the combustion chamber, so that a pulse-type pressure wave is created which penetrates into the combustion chamber. An escape of the overpressure wave is able to be prevented by timely closing of the pulse supercharger, so that compression of the combustion air is achieved overall.

Compression of the combustion air helps to improve the torque behavior of an internal combustion engine. However, compression of the combustion air also goes hand in hand with an undesired increased knocking tendency of an internal combustion engine.

SUMMARY OF THE INVENTION

Accordingly, it is an object of the present invention to provide a method for operating an internal combustion engine, by which the response behavior of the internal combustion engine is improved and a knocking tendency of the internal combustion engine is reduced.

According to the present invention, in a method of the type mentioned in the introduction, this object is achieved in that optionally, in a first operating mode, the combustion air is compressed in order to support a compressor of a turbocharger or, in a second operating mode, combustion air compressed by the compressor is cooled.

The method according to the present invention makes it possible to use the pulse supercharger both for compressing the combustion air and for cooling combustion air that is compressed with the aid of a turbocharger. To cool the combustion air, the pulse supercharger is controlled in such a way that an expansion process which causes pulse cooling of the combustion chamber is able to take place in a combustion chamber of the internal combustion engine.

The pulse supercharger may include a pulse charging valve, which is provided separately from an intake valve of the combustion chamber. This makes it possible to create an accumulator chamber for the storage of aspirated air between the pulse charging valve and the intake valve.

However, the pulse supercharger may possibly also include a pulse charging valve which is provided in the form of an intake valve of the combustion chamber. This produces a pulse supercharger that features an especially simple configuration.

According to one specific embodiment of the present invention it is provided that in the first operating mode, following the closing and subsequent opening of the pulse supercharger, the pulse supercharger is closed at an instant when the combustion air has been maximally compressed. This makes it possible to achieve maximum support of the compressor of the turbocharger.

Furthermore, it is preferred if in the second operating mode, following the closing and subsequent opening of the pulse supercharger, the pulse supercharger is closed at an instant when the combustion air is minimally compressed. In comparison to the first operating mode, the pulse supercharger may take place earlier or later.

Moreover, it is preferred if the method is implemented starting from a part-load operation of the internal combustion engine that transitions into a wide-open throttle operation of the internal combustion engine. In such an operational change, the support of a turbocharger with the aid of pulse supercharging is especially advantageous because, in comparison with charging solely via the turbocharger, combustion air is able to be charged more rapidly, so that a higher torque may be provided earlier.

In an advantageous manner, the first operating mode is selected when the internal combustion engine drops below a specifiable maximum engine speed, and/or when an ignition timing efficiency exceeds a specifiable minimum efficiency. This improves the response of the internal combustion engine, especially at low rotational speeds, by providing additional charge pressure. Indirectly, this also increases the efficiency of the turbine and the compressor of an exhaust turbocharger.

The ignition timing efficiency describes the ratio of an optimum efficiency featuring optimum ignition timing and without active knock restriction, and an instantaneous efficiency at which the ignition timing is at the knock limit. With increasing load, the knock limit rises and the ignition timing efficiency drops.

The second operating mode is advantageously selected when the internal combustion engine exceeds a specifiable minimum rotational speed, and/or when an ignition timing efficiency drops below a specifiable limit value. This makes it possible to use the pulse supercharger not for the purpose of supporting turbo charging, but rather for charge-air cooling, and thus for improving the ignition timing efficiency. This takes into account that an exhaust turbocharger requires increasingly less support as the load and rotational speed rise.

According to one advantageous further development of the present invention, a charge exchange, in which the pulse supercharger and one discharge valve of the combustion chamber are open simultaneously at least intermittently, takes place in the first operating mode and/or the second operating mode. This may also be referred to as scavenging. For example, the pulse supercharger is at least partially open for a few degrees of crank angle (e.g., 10°). Only subsequently will the pulse supercharger be closed for generating vacuum pressure. This procedure has the advantage of reducing the residual gas in the combustion chamber, further reducing the knocking tendency, and of a further charge improvement of the combustion chamber as well as additional support of an exhaust turbocharger.

Especially significant is the implementation of the method according to the present invention in the form of a computer program, which may be stored on an electronic storage medium and in this form, may be assigned to a control unit that controls the internal combustion engine.

DETAILED DESCRIPTION

Figure 1:
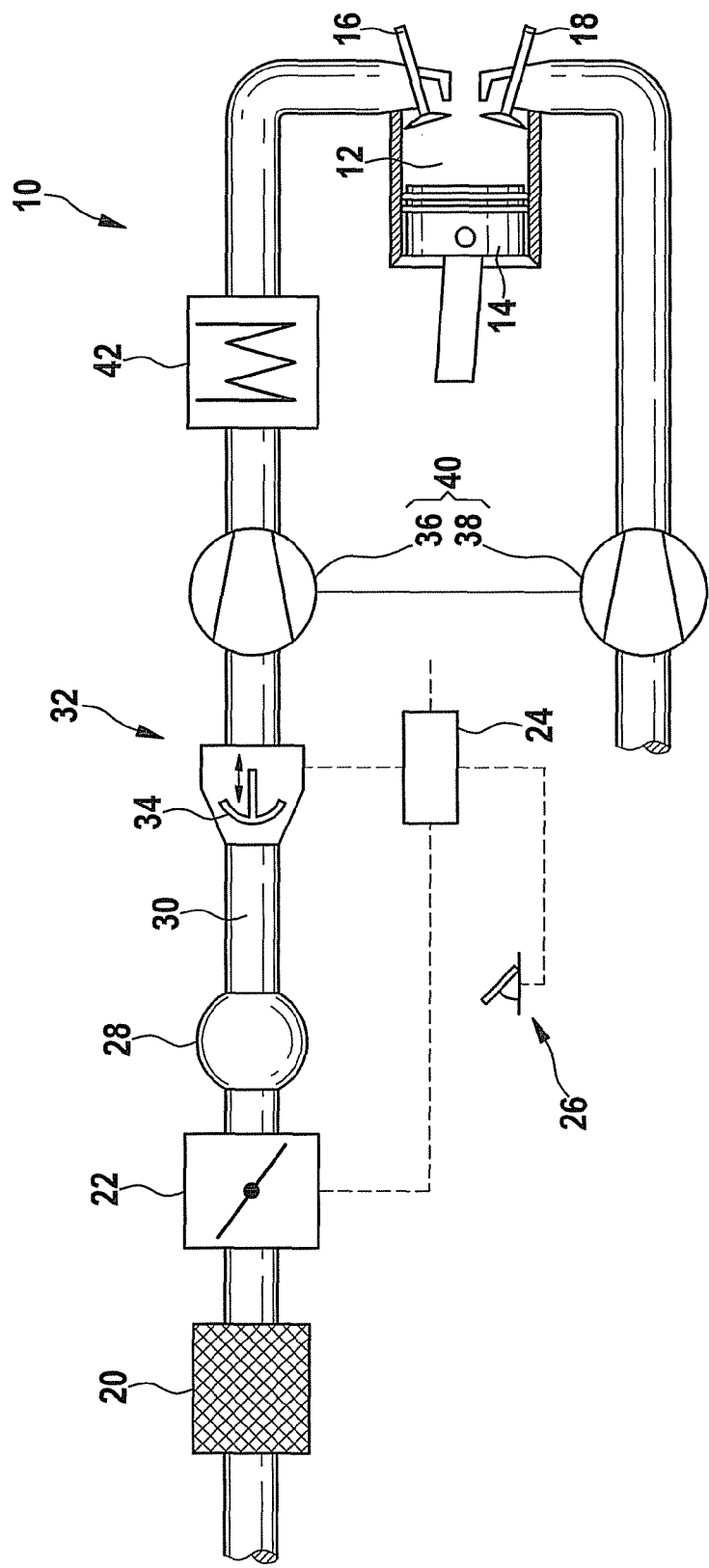
FIG. 1 shows a schematic illustration of an internal combustion engine having a pulse supercharger.

FIG. 1 shows a schematic representation of an internal combustion engine denoted by reference numeral 10 as a whole. Internal combustion engine 10 has at least one combustion chamber 12 inside which a piston 14 is moved up and down with the aid of a crankshaft (not shown). An intake valve 16 is provided in order to control combustion air that is introduced into combustion chamber 12. A discharge valve 18 is provided for controlling the exhaust gas discharged from combustion chamber 12.

Internal combustion engine 10 includes an air filter 20 for filtering fresh air. A throttle valve 22 is provided to control a filtered flow of fresh air. Throttle valve 22 is triggered with the aid of a control unit 24, which processes signals from a driver pedal 26 for this purpose.

Downstream from throttle valve 22 is a collection region 28, which terminates in an intake duct 30. Disposed in intake duct 30 is a pulse supercharger 32, which includes a pulse charging valve 34 by which intake duct 30 is able to be opened or closed.

To compress fresh air, a compressor 36 is provided with whose aid a turbine 38 is driven. Turbine 38 in turn is driven by exhaust gas discharged from combustion chamber 12. Compressor 36 and turbine 38 jointly form a turbocharger 40.

A charge-air cooler 42 is provided to cool combustion air compressed with the aid of the turbocharger.

Exhaust gas discharged from combustion chamber 12 is routed through turbines 38 and arrives at an exhaust discharge 44.

Appropriate valves, e.g., an exhaust-control valve and/or controllable bypasses, in particular, may be provided for the purpose of controlling an exhaust flow supplied to turbine 38.

Figure 2:
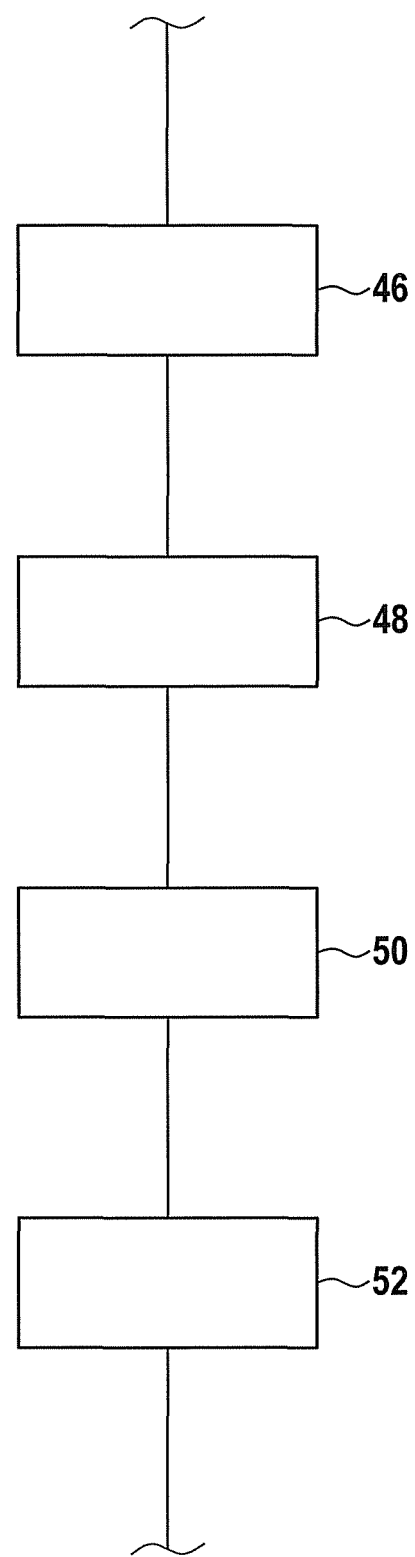
FIG. 2 shows a schematic illustration of a sequence of a method for operating the internal combustion engine.

Control unit 24 controls pulse charging valve 34 of pulse supercharger 32. In an effort to operate internal combustion engine 10 in such a way that both a high torque is able to be provided and a knocking operation is avoided, a method shown schematically in FIG. 2 is run through.

In a phase 46, a full-load operating point of internal combustion engine 10 is requested by actuating driving pedal 26. In a phase 48, throttle valve 22 is opened, so that pressure is generated in intake duct 30, in particular to ambient pressure.

Figure 3:
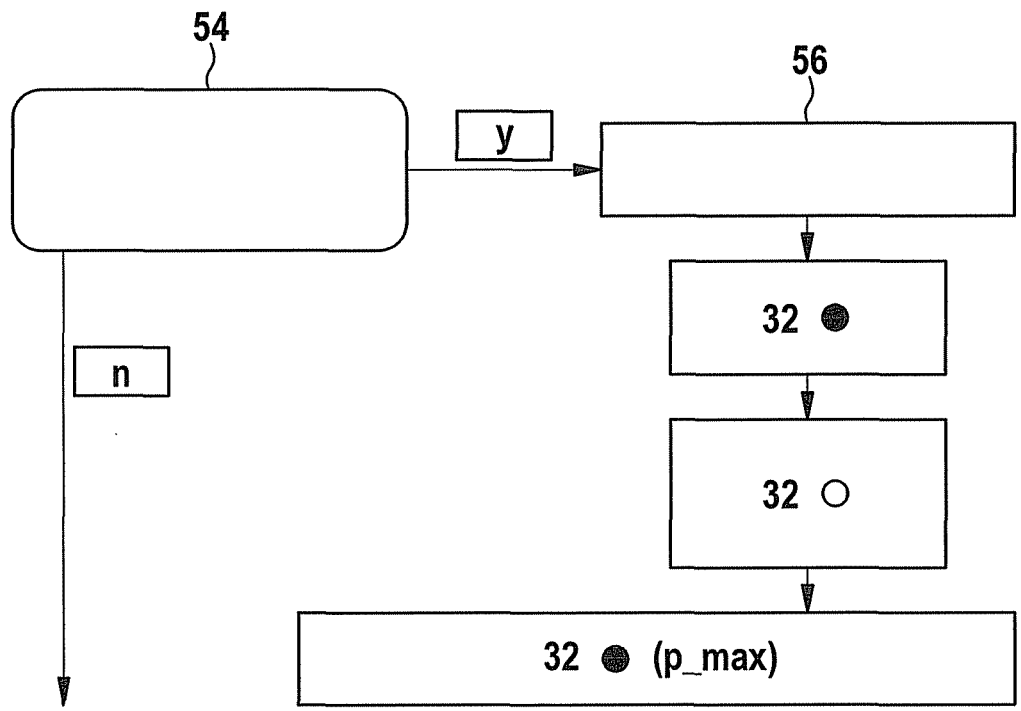
FIG. 3 shows a schematic illustration of the operation of the pulse supercharger in a first operating mode.

In a phase 50, pulse supercharger 32 is operated in a first operating mode (cf. FIG. 3).

Figure 4:
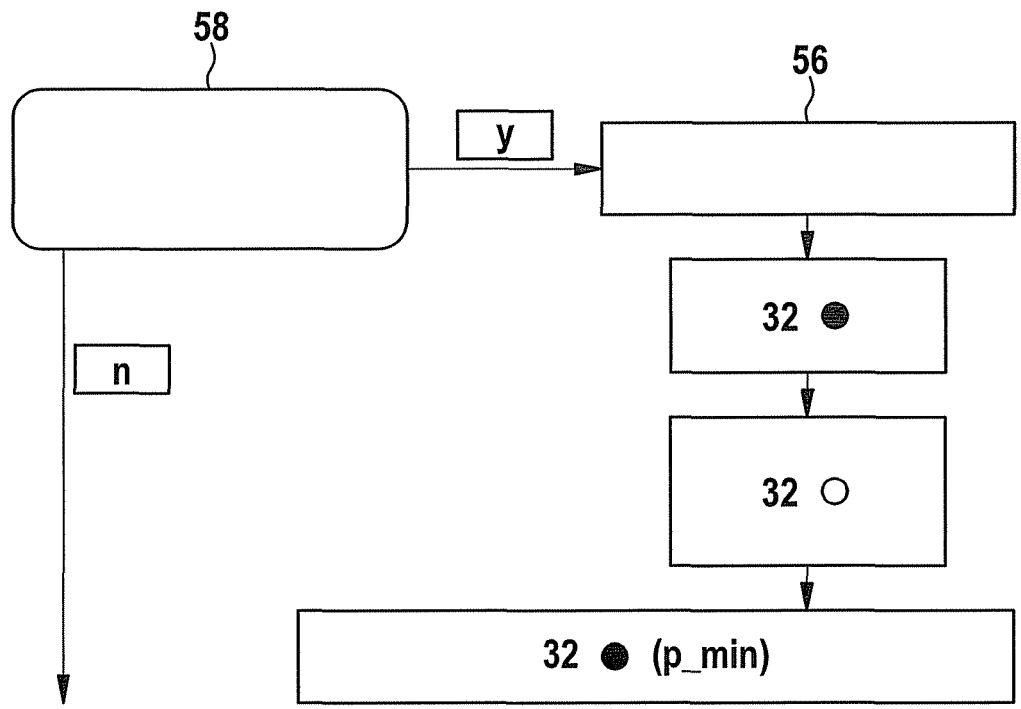
FIG. 4 shows a schematic illustration of the operation of the pulse supercharger in a second operating mode.

In a phase 52, pulse supercharger 32 is operated in a second operating mode (cf. FIG. 4).

Phase 50 (first operating mode, FIG. 3) is run through if one or a plurality of condition(s) 54 is satisfied. Specifically, all of the following conditions must be satisfied: (1) the ignition timing efficiency is greater than a specifiable limit value; (2) the rotational speed of internal combustion engine 10 is less than a specifiable maximum rotational speed (e.g., less than approximately 2000 rotations per minute). If the above conditions are satisfied, then pulse charging valve 34 and discharge valve 18 may be opened simultaneously in an optional phase 56 in the region of a charge exchange-OT (scavenging).

During an intake stroke of internal combustion engine 10, pulse supercharger 32 is closed to begin with, then opened again and closed at an instant when a pressure maximum p_max prevails in combustion chamber 12.

The run-through of phase 52 (second operating mode, FIG. 4) is preferably tied to the satisfaction of at least one of the following conditions 58, particularly the satisfaction of all of the following conditions 58: (1) the ignition timing efficiency is less than a specifiable limit value; (2) the rotational speed of internal combustion engine 10 is greater than a specifiable minimum rotational speed (e.g., greater than approximately 2000 rotations per minute).

When conditions 58 are satisfied, it is optionally possible to run through phase 56 again, which was already described above with reference to phase 50.

After closing and opening pulse supercharger 32, it is closed at an instant when minimum pressure prevails in combustion chamber 12. This makes it possible to improve the knocking behavior of internal combustion engine 10 by expanding and corresponding cooling of the charge air.

What is claimed is:

1. A method for operating an internal combustion engine, in which combustion air is supplied to a combustion chamber of the internal combustion engine, which is compressed with the aid of a pulse supercharger, the method comprising:
   controlling a pulse supercharger in a first operating mode to compress the combustion air in order to support a compressor of a turbocharger; and
   controlling the pulse supercharger in a second operating mode to cool combustion air that had been compressed by the compressor;
   wherein the first operating mode is activated responsive to one of: the internal combustion engine dropping below a specifiable maximum rotational speed and an ignition timing efficiency exceeding a specifiable value.

2. The method according to claim 1, wherein the pulse supercharger includes a pulse charging valve, which is provided separately from an intake valve of the combustion chamber.

3. The method according to claim 1, wherein the pulse supercharger includes a pulse charging valve, which is provided in the form of an intake valve of the combustion chamber.

4. The method according to claim 1, wherein, in the first operating mode, following a closing and subsequent opening of the pulse supercharger, the pulse supercharger is closed at an instant when the combustion air is maximally compressed.

5. The method according to claim 1, wherein, in the second operating mode, following a closing and subsequent opening of the pulse supercharger, the pulse supercharger is closed at an instant when the combustion air is minimally compressed.

6. The method according to claim 1, wherein the method is performed starting from a part-load operation of the internal combustion engine in a transition into a wide open throttle operation of the internal combustion engine.

7. A method for operating an internal combustion engine, in which combustion air is supplied to a combustion chamber of the internal combustion engine, the method comprising:
   controlling a pulse supercharger in a first operating mode to compress the combustion air in order to support a compressor of a turbocharger; and
   controlling the pulse supercharger in a second operating mode to cool combustion air that had been compressed by a compressor;
   wherein the second operating mode is activated responsive to one of: the internal combustion engine exceeding a specifiable minimum rotational speed and an ignition timing efficiency dropping below a specifiable value.

8. The method according to claim 1, wherein, in at least one of the first operating mode and the second operating mode, a charge exchange takes place in which the pulse supercharger and a discharge valve of the combustion chamber are open simultaneously, at least intermittently.

9. A non-transitive computer-readable medium containing a computer program which, when executed by a processor, causes the processor to perform a method for operating an internal combustion engine, in which combustion air is supplied to a combustion chamber of the internal combustion engine, the method comprising:

controlling a pulse supercharger in a first operating mode to compress the combustion air in order to support a compressor of a turbocharger; and controlling the pulse supercharger in a second operating mode to cool combustion air that had been compressed by the compressor;

wherein at least one of:

the first operating mode is activated responsive to one of: the internal combustion engine dropping below a specifiable maximum rotational speed and an ignition timing efficiency exceeding a specifiable value; and the second operating mode is activated responsive to one of: the internal combustion engine exceeding a specifiable minimum rotational speed and an ignition timing efficiency dropping below a specifiable value.

10. A control unit for operating an internal combustion engine, in which combustion air is supplied to a combustion chamber of the internal combustion engine, the control unit comprising:

an arrangement for:

controlling a pulse supercharger in a first operating mode to compress the combustion air in order to support a compressor of a turbocharger; and controlling the pulse supercharger in a second operating mode to cool combustion air that had been compressed by of the compressor;

wherein at least one of:

the first operating mode is activated responsive to one of: the internal combustion engine dropping below a specifiable maximum rotational speed and an ignition timing efficiency exceeding a specifiable value; and the second operating mode is activated responsive to one of: the internal combustion engine exceeding a specifiable minimum rotational speed and an ignition timing efficiency dropping below a specifiable value.

* * * * *